United States Patent [19]

Landry et al.

[11] Patent Number: 4,722,174
[45] Date of Patent: Feb. 2, 1988

[54] TWO-ROW SUGAR CANE HARVESTER

[75] Inventors: Walter J. Landry, Jeanerette; Robert T. André, New Iberia, both of La.

[73] Assignee: Agronomics, Inc., Jeanerette, La.

[21] Appl. No.: 737,218

[22] Filed: May 23, 1985

[51] Int. Cl.⁴ .............................................. A01D 45/10
[52] U.S. Cl. ...................................... 56/14.5; 56/14.3; 56/14.2; 56/119; 56/192
[58] Field of Search ........................ 56/13.9, 14.1, 14.3, 56/14.2, 14.5, 15.1, 16.4, 27.5, 71, 72, 76, 78, 85, 95, 119, 157, 192, 94, 153

[56] References Cited

U.S. PATENT DOCUMENTS

| | | | |
|---|---|---|---|
| 2,427,313 | 9/1947 | Thomson | 56/192 |
| 3,095,679 | 7/1963 | Pugh et al. | 56/14.5 |
| 3,448,564 | 6/1969 | Chauffe | 56/14.9 |
| 3,462,921 | 8/1969 | Meredith | 56/14.5 |
| 3,481,121 | 12/1969 | Broussard | 56/14.5 |
| 3,673,774 | 7/1972 | Mizzi | 56/14.5 |
| 4,165,596 | 8/1979 | Duncan | 56/14.3 |
| 4,483,130 | 11/1984 | Duncan | 56/192 |

Primary Examiner—John Weiss
Attorney, Agent, or Firm—Fleit, Jacobson, Cohn & Price

[57] ABSTRACT

A two-row sugar cane harvester utilizing a single crossing arm for conveying two rows of cane rearwardly, merging the two rows of cane and discharging the two rows of cane at laterally adjusted positions in relation to the path of travel of the harvester with the crossing arm including a laterally adjustable discharge mechanism enabling six-row heaps of sugar cane to be formed without rolling over the initial row. The crossing arm includes a unique powered sticker chain arrangement oriented in opposed relation to a non-powered roller chain for gripping and conveying the sugar cane stalks in relation to the harvester. The forward end of the harvester includes a novel arrangement of lower and upper pairs of scroll-type gathering and lifting devices and a novel cutting and shredding assembly for cutting and chopping the immature upper end portions of the sugar cane stalks.

6 Claims, 11 Drawing Figures

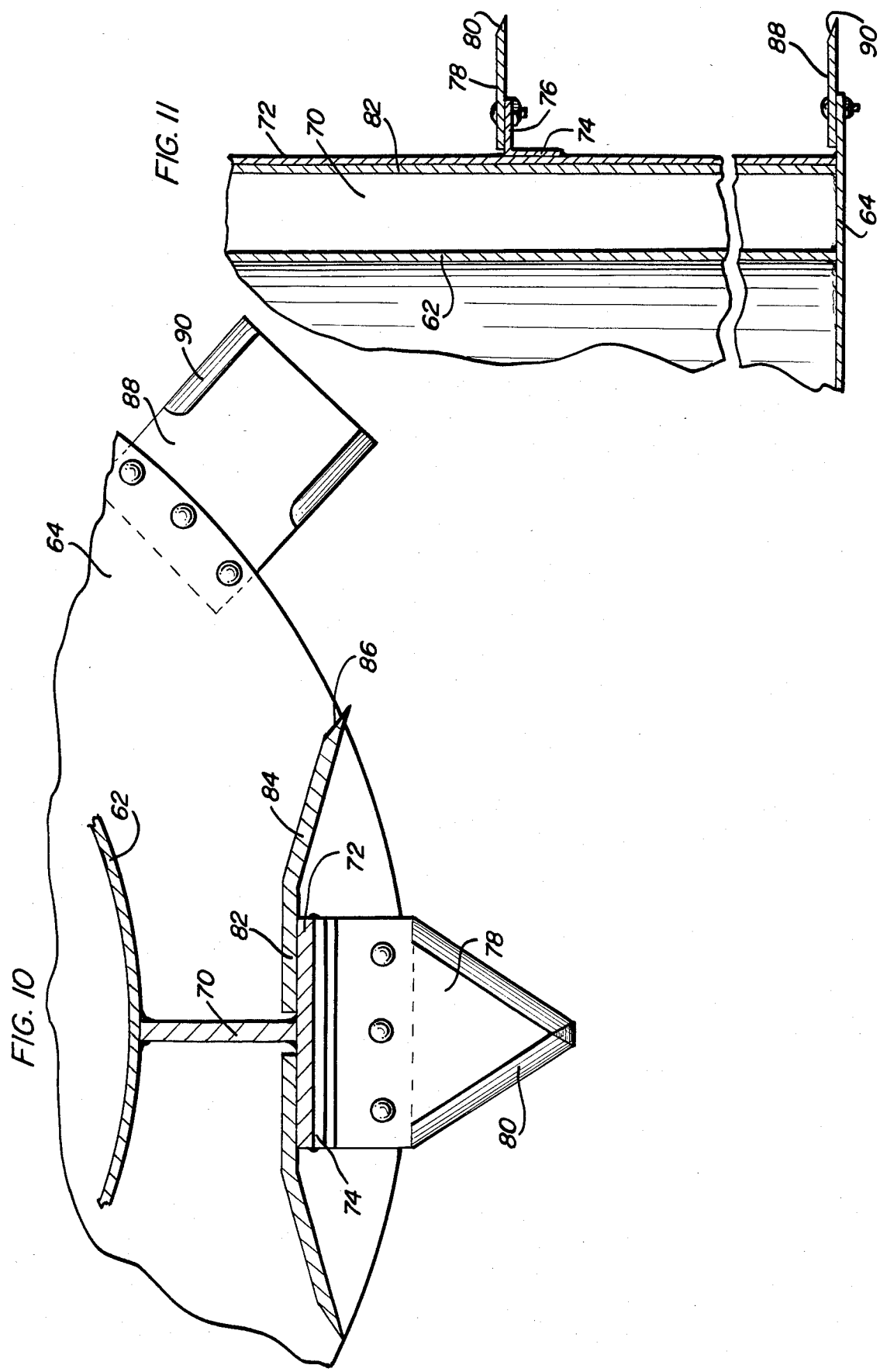

TWO-ROW SUGAR CANE HARVESTER

BACKGROUND OF THE INVENTION

FIELD OF THE INVENTION

The present invention generally relates to a sugar cane harvester and more specifically a harvester for simultaneously gathering, lifting and severing sugar cane from two rows of cane and chopping or shredding the immature top portions of the sugar cane stalks and transporting the two rows of stalks rearwardly and laterally to a single discharge point adjustable laterally of the center line of the harvester to enable sugar cane to be deposited on the ground surface in six row heaps without rolling over the initial row of sugar cane. A single crossing arm arrangement is provided on the harvester for carrying the two rows of sugar cane stalks to a single discharge point and a powered sticker chain is utilized in opposed relation to a non-powered roller chain in the structure for transporting the sugar cane stalks from two rows to a single discharge point.

INFORMATION DISCLOSURE STATEMENT

In the harvesting of sugar cane, machines have been provided to gather and cut off sugar cane stalks and deposit them on the ground surface for subsequent pickup. Such machines have also been provided with devices for severing the immature tops of the sugar cane and chopping or shredding them and dropping this material back onto the ground surface. The following U.S. patents disclose the developments in this art: U.S. Pat. Nos.

| | | |
|---|---|---|
| 2,427,313 | B. C. Thomson | Sept. 9, 1947 |
| 2,669,829 | J. M. Pugh | Feb. 23, 1954 |
| 3,090,185 | B. C. Thomson | May 21, 1963 |
| 3,095,679 | J. M. Pugh et al | July 2, 1963 |
| 3,462,927 | D. J. Quick | Aug. 26, 1969 |
| 3,561,197 | H. A. Willett | Feb. 9, 1971 |
| 3,705,481 | H. A. Willett | Dec. 12, 1972 |
| 3,772,864 | K. Rodrigue | Nov. 20, 1973 |
| 3,791,114 | L. G. Fowler | Feb. 12, 1974 |
| 3,925,969 | O. Shunichi | Dec. 16, 1975 |
| 3,934,391 | D. J. Brassette et al | Jan. 27, 1976 |
| 3,942,307 | D. J. Quick | Mar. 9, 1976 |
| 4,165,596 | R. A. Duncan | Aug. 28, 1979 |
| 4,408,441 | H. A. Willett | Oct. 11, 1983 |

SUMMARY OF THE INVENTION

An object of the present invention is to provide a sugar cane harvester having unique structural features enabling two rows of sugar cane stalks to be gathered, lifted and severed at a point adjacent the ground surface with the immature tops also being severed, chopped and shredded by an improved top cutter and shredder with the stalks from the two rows when being moved rearwardly in relation to the machine by a single crossing arm for discharge of both rows of sugar cane stalks at a single discharge point with the discharge point being laterally adjusted in relation to the path of movement of the machine whereby six rows of sugar cane stalks may be placed in a single heap row during subsequent traversal of the harvester in relation to adjacent rows of sugar cane.

Our prior application, U.S. Ser. No. 552,472, filed Nov. 16, 1983 now U.S. Pat. No. 4,512,142 issued Apr. 25, 1985, for SCROLL-TYPE GATHERER AND TOP SHREDDER WITH LONGITUDINAL BLADES FOR SUGAR CANE HARVESTERS which is a continuation-in-part of U.S. Ser. No. 542,700, filed Oct. 17, 1983, for SCROLL-TYPE GATHERER AND TOP SHREDDER FOR SUGAR CANE HARVESTER, now abandoned, discloses the forward portion of a sugar cane harvester including a scroll-type gatherer and a structure for severing the lower end portion of the sugar cane stalks and a top shredder. The structures disclosed in these applications are incorporated herein by reference thereto with it being another object of the invention to provide an improved top cutter and shredder for the immature top portions of the sugar cane stalks and to provide an improved scroll-type gathering and lifting assembly for the sugar cane stalks and the leaves thereon.

A further object of the invention is to provide a sugar cane harvester constructed for harvesting two rows of sugar cane stalks with the two rows of sugar cane stalks being combined and discharged at a single point by using a single crossing arm arrangement.

Still another object of the invention is to provide a two-row sugar cane harvester utilizing a frame configuration that enables lateral adjustment of the discharge mechanism in order to make six-row heaps without rolling over the initial row thereby reducing the quantity of mud or similar material picked up with the sugar cane and rendering the sugar cane harvesting operation more efficient.

A still further object of the invention is to provide a two-row sugar cane harvester in accordance with the preceding objects in which the mechanism for conveying the sugar cane stalks includes the use of a powered sticker chain in opposed relation to a non-powered roller chain for conveying the sugar cane stalks.

Yet another important object of the present invention is to provide a two-row sugar cane harvester in accordance with the preceding objects which is efficient in harvesting sugar cane and depositing it in six-row heaps with the structure being dependable in operation and easily maintained.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 10 is a fragmental, plan sectional view of the top shredder.

FIG. 11 is a fragmental vertical sectional view of the top shredder.

DESCRIPTION OF THE PREFERRED EMBODIMENT

Figure 1:
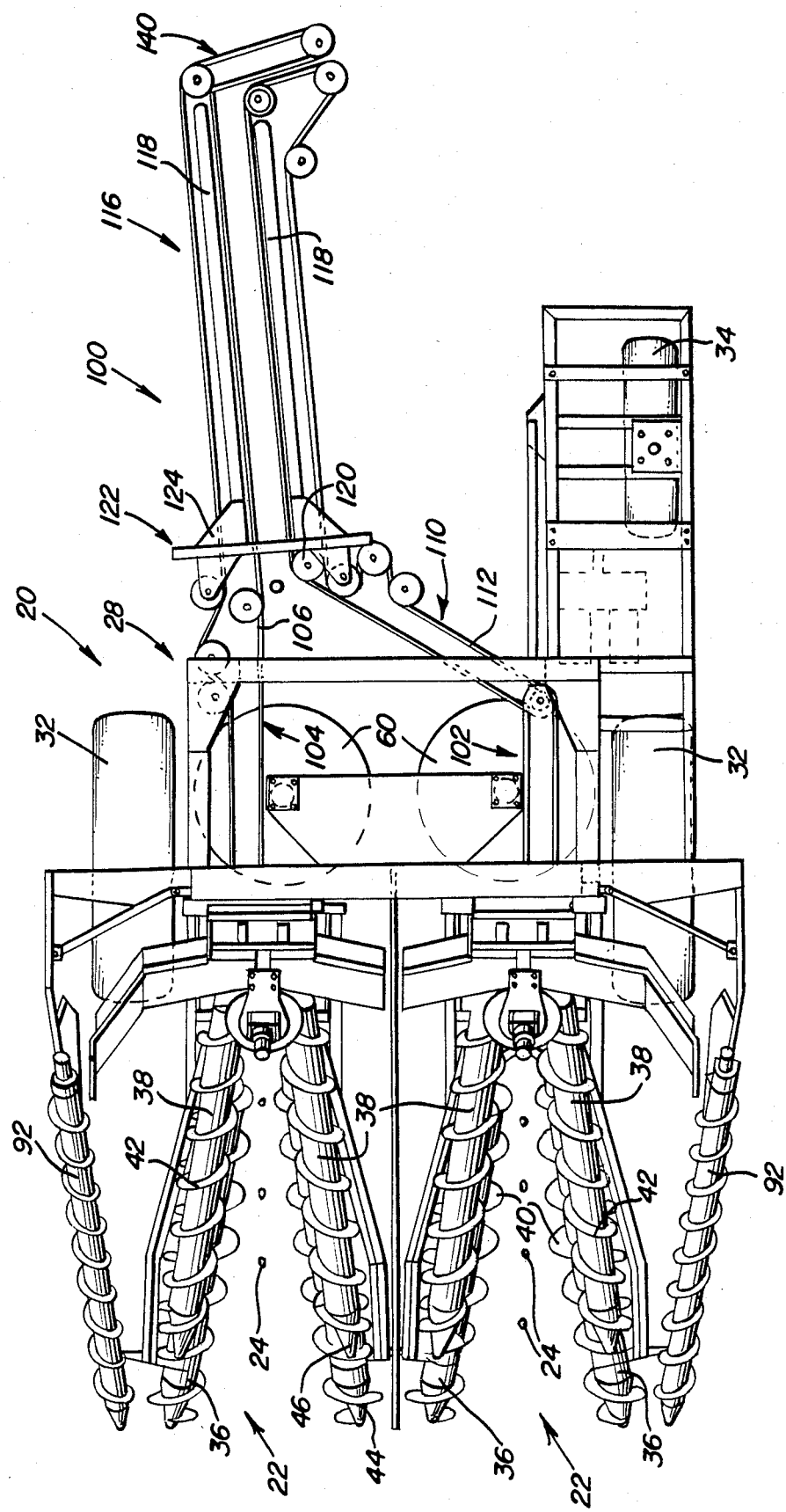
FIG. 1 is a top plan view of the two-row sugar cane harvester of the present invention.
Figure 2:
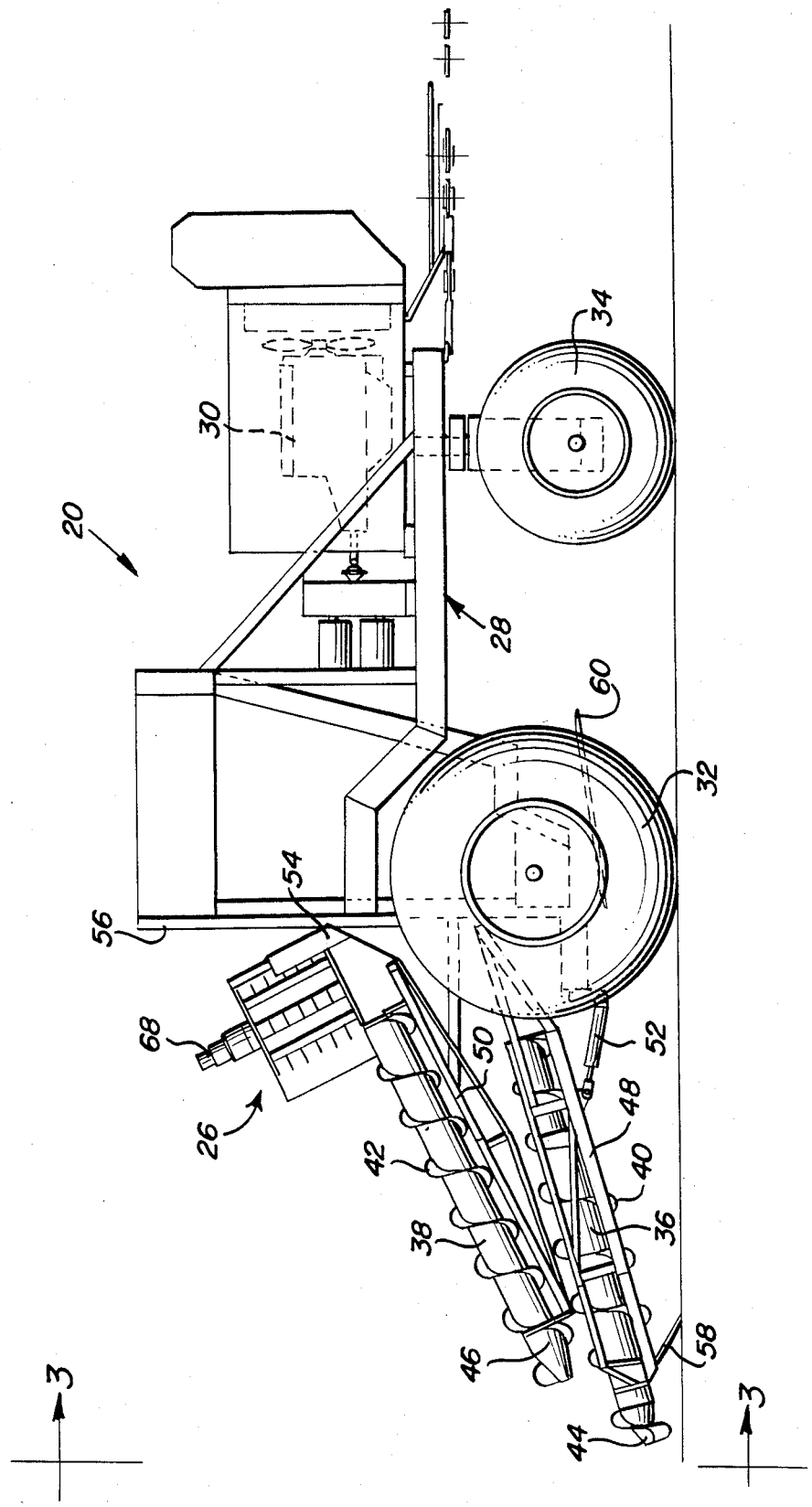
FIG. 2 is a side elevational view of the forward portion of the harvester.
Figure 3:
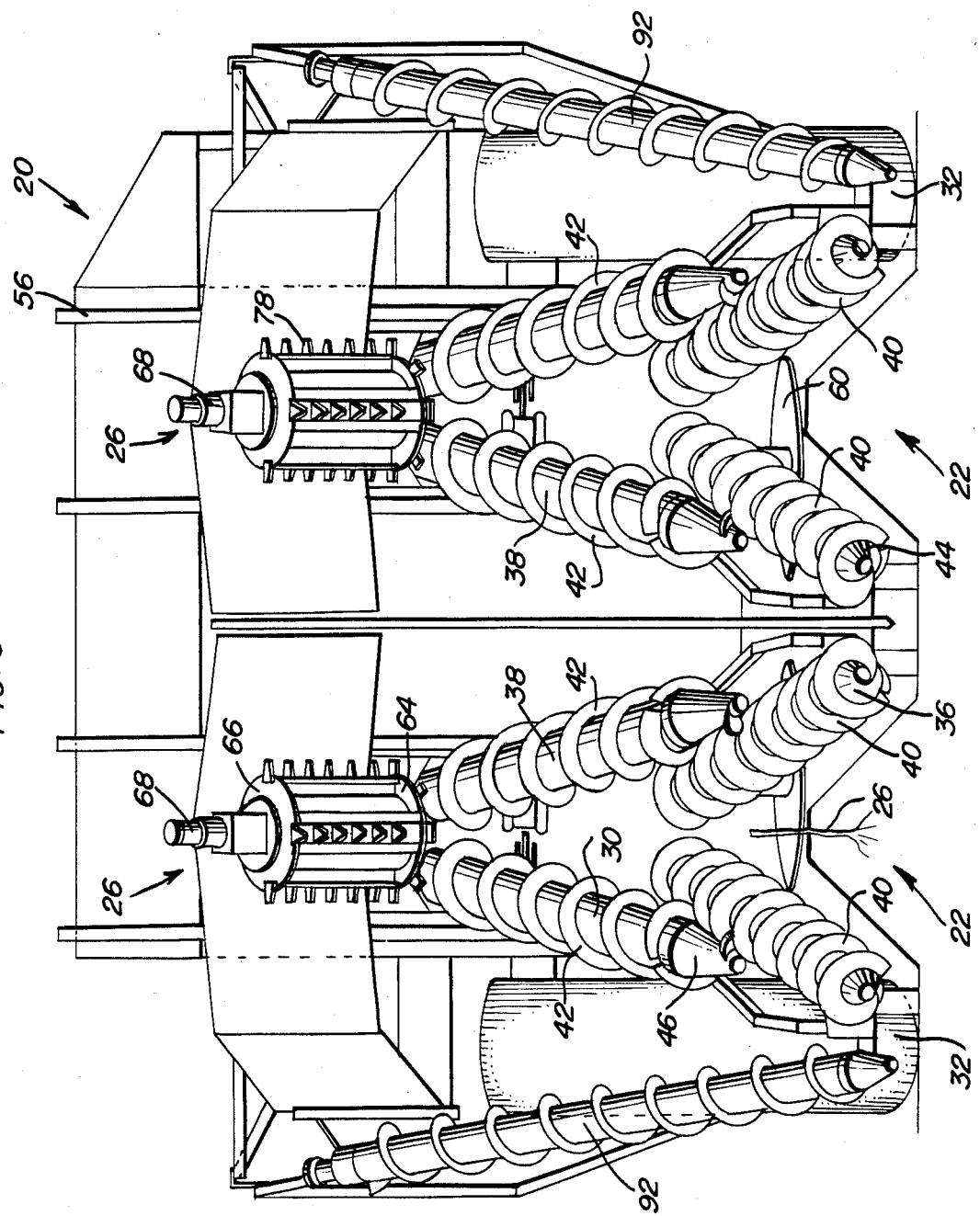
FIG. 3 is a front view of the harvester.

Referring now specifically to the drawings, the two-row sugar cane harvester of the present invention is generally designated by numeral 20 and includes a pair of gathering, lifting and severing units 22 at the forward end thereof for gathering and lifting the sugar cane stalks and leaves from two rows of sugar cane stalks 24 with the stalks being severed adjacent the ground surface. At the upper inner end of each of the gathering, lifting and severing units, there is provided a top cutter and shredder generally designated by numeral 26 by which the immature tops of the sugar cane stalks 24 can be severed from the main portion of the stalks with the severed upper portion being shredded and dropped back onto the ground surface. Also, the harvester 20 includes a main frame structure 28 having a prime mover in the form of an internal combustion engine 30 mounted thereon and a pair of large front drive wheels 32 oriented in transverse alignment outwardly of the gathering, lifting and severing units as illustrated in FIG. 1 and rearwardly thereof as illustrated in FIG. 2. A single rear steering wheel 34 is provided on the left side of the frame 28 in longitudinal alignment with and spaced rearwardly from the left front drive wheel 32 as illustrated in FIGS. 1 and 2. The frame 28 supports an operator's station by which the hydraulically assisted rear steerable wheel 34 can be controlled along with the engine and drive wheels with such controls at the operator's station being conventional and forming no specific part of the present invention. Each gathering, lifting and severing unit 22 includes a pair of bottom scrolls 36 and a pair of top scrolls 38 with the bottom scrolls 36 including a spiral flight 40 thereon and the top scrolls 36 also including a spiral flight 42 thereon with the forward ends of the generally cylindrical scrolls 36 and 38 being tapered as at 44 and 46. The scrolls 36 and 38 are rotatably supported by adjustable frame structures 48 and 50 which can be elevated and lowered by hydraulic piston and cylinder assemblies 52 with the rear of the top scrolls being vertically adjusted by movement of a carriage 54 in vertical tracks 56 so that the elevational position of the top cutter and shredder 26 can be varied. The forward end of the bottom scrolls 36 may be provided with a skid runner or the like 58 for supportingly engaging the ground surface. Also, a pair of rotatable cutters 60 are located at the rear of the units 22 for severing the sugar cane stalks 24 adjacent the ground surface with the cutters 60 being in the form of circular bladed member which are conventionally employed in sugar cane harvesters. Thus, rather than using bottom gathering chains with projections thereon as disclosed in the aforementioned co-pending application and which are conventionally used on sugar cane harvesters, the harvester of this invention utilizes the bottom scrolls 36 which are rotatably journalled and driven by a hydraulic motor or the like so that as the bottom scrolls 36 rotate and converge rearwardly and incline upwardly, the bottom leaves and stalks will be gathered and lifted upwardly above the rotatable and driven cutter 60 so that the stalks may be easily severed. Also, the upper scrolls 38 converge rearwardly and incline upwardly for gathering and lifting the upper portions and upper leaves of the stalks with the function of the upper scrolls being more specifically defined in the aforementioned co-pending application. Each top cutter and shredder 26 is oriented generally in the same position as the top cutter and shredder disclosed in the aforementioned co-pening application but has an improved and unique structure as compared with that disclosed in the co-pending application.

The improved cutter details are illustrated in FIGS. 10 and 11 and include a cylindrical drum 62 having a bottom plate or flange 64 rigid therewith and a top plate 66 also rigid therewith and a hydraulic motor 68 for rotating the cutter drum and plates or flanges. Extending vertically at four points around the circumference of the drum 62 is a radial web or flange 70 having a flange 72 perpendicular thereto and extending throughout the length of the web 70 as illustrated in FIG. 11. Attached to the vertical flange 72 is a plurality of L-shaped flanges 74 each of which includes a horizontal, outwardly extending radial flange 76 rigid therewith. Each support flange 76 has a generally horizontally disposed blade 78 affixed thereto with the blade projecting radially outwardly and generally V-shaped in configuration with bevelled and sharpened outwardly converging cutting edges 80 as illustrated in FIG. 10. Attached to the inner surface of the flange 72 and on each side of the web 70 is a blade 82 having a radially outwardly angulated end portion 84 having a bevelled or sharpened end edge 86 generally coinciding with the periphery of the plates 64 and 66 with the major portion of the blade 78 projecting outwardly beyond the periphery of the bottom plate 64 and the top plate 66. Also attached to the bottom plate 64 is a plurality of blades 88 having bevelled or sharpened side edges 90 which project outwardly beyond the plate 64 with the blades 88 being oriented intermediate or between the webs 70. Also, a blade 78 is mounted on the bottom plate 64 and on the top plate 66 with all of the blades being in vertical rows with there being four rows of blades around the periphery of the drum with seven blades in each row. The plate or blade 82 extends continuously from top to bottom of the cutter between the plates 64 and 66 so that eight plates 82 are utilized with the angle of the angulated portion 84 being approximately 15° in relation to the plate 82. The drum 62 is mounted on a central shaft with the blades 78, 82 and 88 being removably secured in place by bolts, rivets and the like.

The combination of the radial blades and longitudinal blades effectively cut, chop and shred the immature tops from the sugar cane stalks with the rotational axis of the top cutter and shredder being inclined forwardly so that the upper tip end portion of the immature tops of the stalks will be engaged first by the knife or blade components. The rotational direction of the top cutter and shredder may be in either direction for discharging the shredded material in a desired lateral direction. Also, a row divider scroll 92 is orineted outwardly of the gathering, lifting and severing units and are driven in a suitable manner and the cutter discs 60 are driven in a suitable manner and are supported below the frame 28 to cut the sugar cane stalks 24 adjacent the ground surface in a well known manner so that sugar cane in the rows is gathered, lifted and severed with the immature upper ends being chopped and the material discharged back onto the ground surface and the harvested sugar cane stalks are then conveyed rearwardly and layed down transversely of the path of movement of the harvester.

Mounted rearwardly of the frame 28 is a conveying apparatus generally designated by the numeral 100 which enables two rows of cane to be handled by one common crossing or piling arm which enables the harvester to pile two rows of cane directly behind itself on the first pass with the return pass then cutting two rows to the right of the initial pass and pile the cane therefrom on top of the initial pile of two rows and the third pass then will cut the two rows to the left of the initial pass and pile the same on top of the cane from the initial two rows and from the two rows cut during the second pass thereby enabling six-row heaps to be formed without rolling over the initial row as is presently necessary with single row harvesters.

Figure 7:
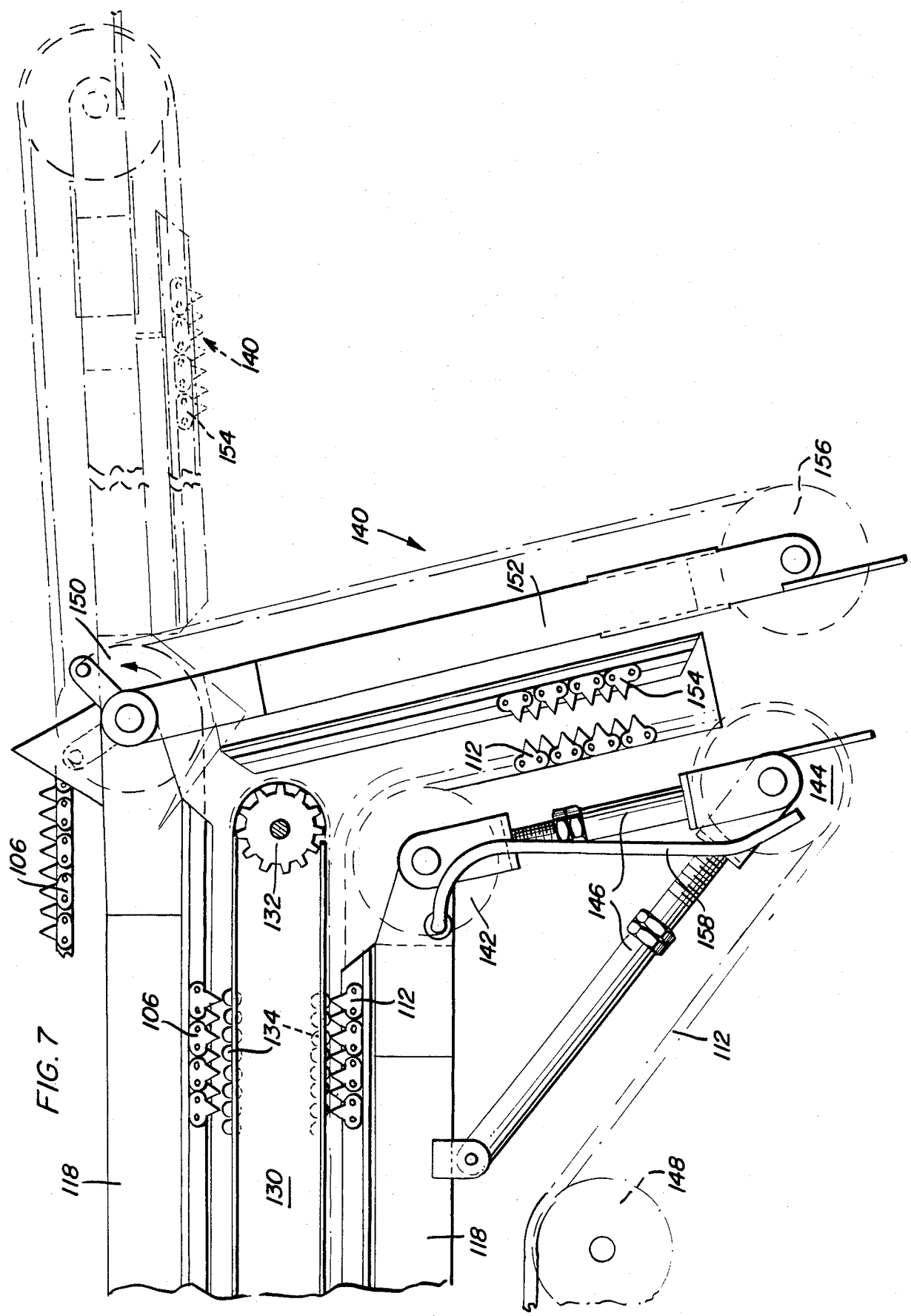
FIG. 7 is a fragmental plan view illustrating the discharge end of the single crossing arm and a discharge unit.
Figure 9:
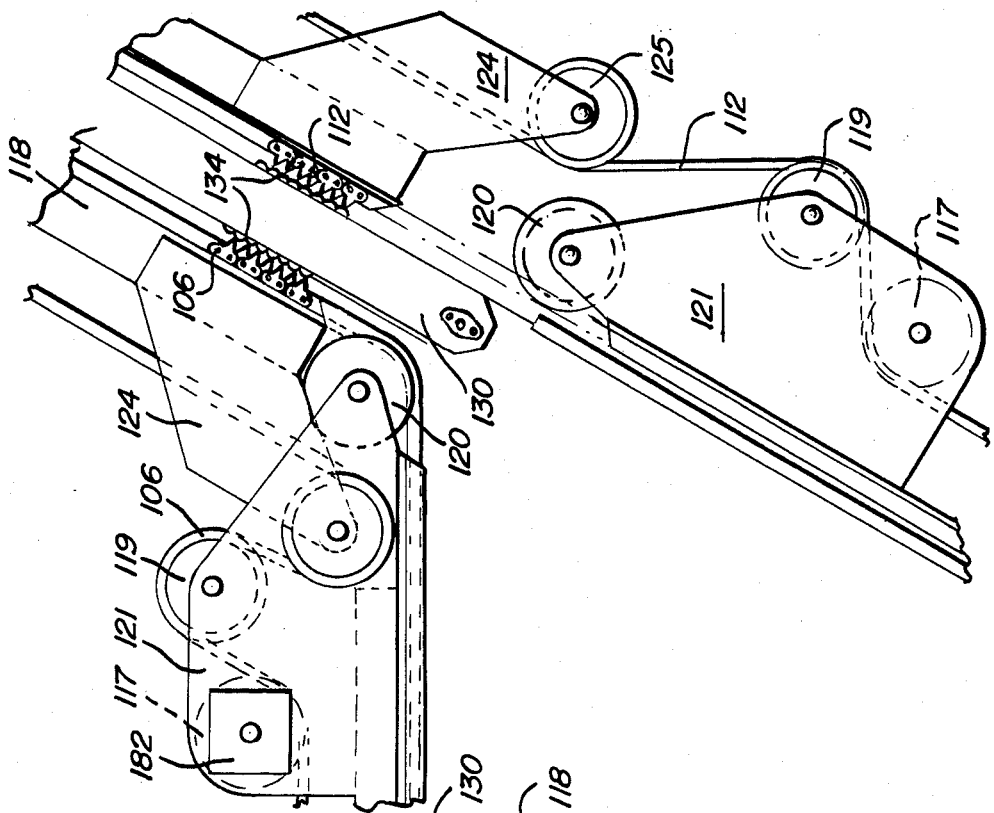
FIG. 9 is a fragmental plan view illustrating the single crossing arm in another position.
Figure 8:
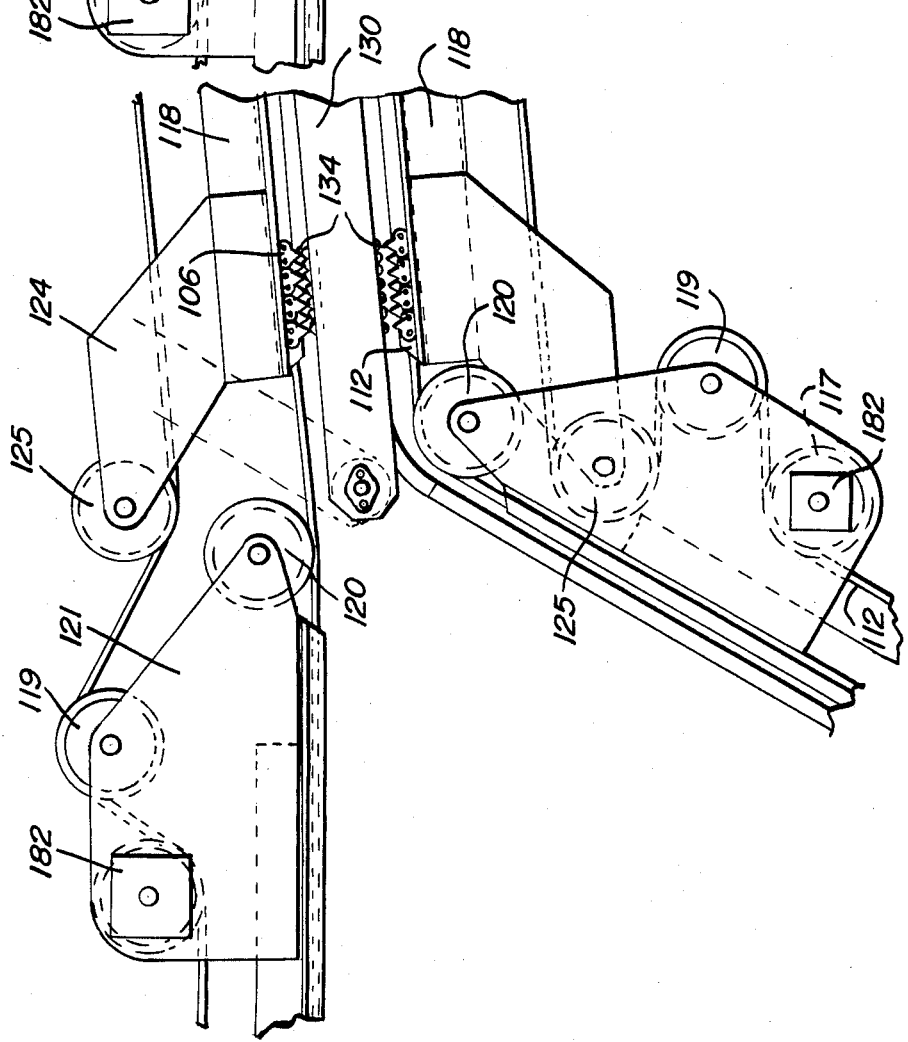
FIG. 8 is a fragmental plan view illustrating the single crossing arm in one position.

The conveying unit 100 is illustrated schematically in FIG. 1 and in more detail in FIGS. 4-9 and includes a pair of longitudinally extending conveying assemblies 102 and 104 oriented along opposite sides of the frame 28 for conveying sugar cane stalks 24 from a first row and second row, respectively, with each of the conveying assemblies 102 and 104 including a conveying chain 106 and a guide 108 opposed thereto for grippingly engaging and moving the sugar cane stalks rearwardly in relation to the frame with each chain 106 being a driven sticker chain with projections which engage the sugar cane stalks. The rear of the conveying assembly 102 includes a rearwardly and inwardly inclined conveying assembly 110 including a driven conveying sticker chain 112 and a guide 114 in opposed relation thereto which inclines at an angle of approximately 60° to carry the sugar cane from the No. 1 row to merge with and join with the sugar cane from the No. 2 row which was conveyed rearwardly by the conveying assembly 104. The conveying assembly 110 and the conveying assembly 104 merge with and discharge into a single crossing arm 116 in which the sticker chain 112 from conveying assembly 110 continues along with the chain 106 from the conveying assembly 104. The crossing arm 116 includes frame members 118 which are interconnected at their inner ends by a transverse support arch 122 having support brackets 124 rotatably supporting movable sprockets 126. Sprocket gears 120 are mounted along with idler sprockets 119 and driven sprockets 117 supported by brackets 121 at the ends of the conveying assemblies 110 and 114, respectively, so that the crossing arm 116 can be oriented in the position illustrated in FIGS. 1 and 8 or in the position illustrated in FIG. 9. Positioned between the parallel positions of the sticker chains 106 and 112 inwardly of the frame members 118, there is provided a frame member 130 having a dual sprocket gear 132 at each end thereof each receiving a roller chain 134 which moves in opposed relation to the chains 112 and 106 with the sprocket gear 132 at each end of the frame member 130 being a dual sprocket gear and the chain 134 being duplicated with the two chains being free of each other and oriented in opposed relation to the sticker chains 112 and 106 to retain the sugar cane in position for movement longitudinally of the crossing arm 116 so that the sugar cane will be conveyed longitudinally of the crossing arm 116 and discharged by a discharge unit 140 illustrated in FIG. 7. The sticker chain 112 continues past the frame member 118 and engages a sprocket gear 142 and a sprocket gear 144 adjustably supported by adjustable support rod brackets 146 with the return run of the chain 112 passing over a sprocket 148 for return to the movable sprocket 125 mounted at the end of the bracket 124. The sticket chain 106 extends around a double sprocket gear 150 at the end of the frame 118 and then returns to the sprocket gear 125 mounted on the opposite bracket 124. Pivotally supported for movement about the rotational axis of the double sprocket gear 150 is a frame 152 having a sticker chain 154 thereon entrained over an end sprocket gear 156 and one of the dual sprocket gears 150 so that the sticker chain 154 will be driven from the chain 106 and in the same direction so that the discharge unit 140 can be oriented generally in alignment with the crossing arm or in angular relation thereto. FIG. 7 also illustrates the end sprocket gear 132 on the outer end of the frame 130 and also shows the roller chain 134. A guide bar 158 is mounted on the end of the frame 118 adjacent the sprocket gear 142 and serves to form a guide for the sugar cane when the discharge unit 140 is in alignment with the crossing arm 116 but movable to the position illustrated in FIG. 7 when the discharge unit 140 is oriented in the angular relation illustrated in solid line in FIG. 7.

Figure 5:
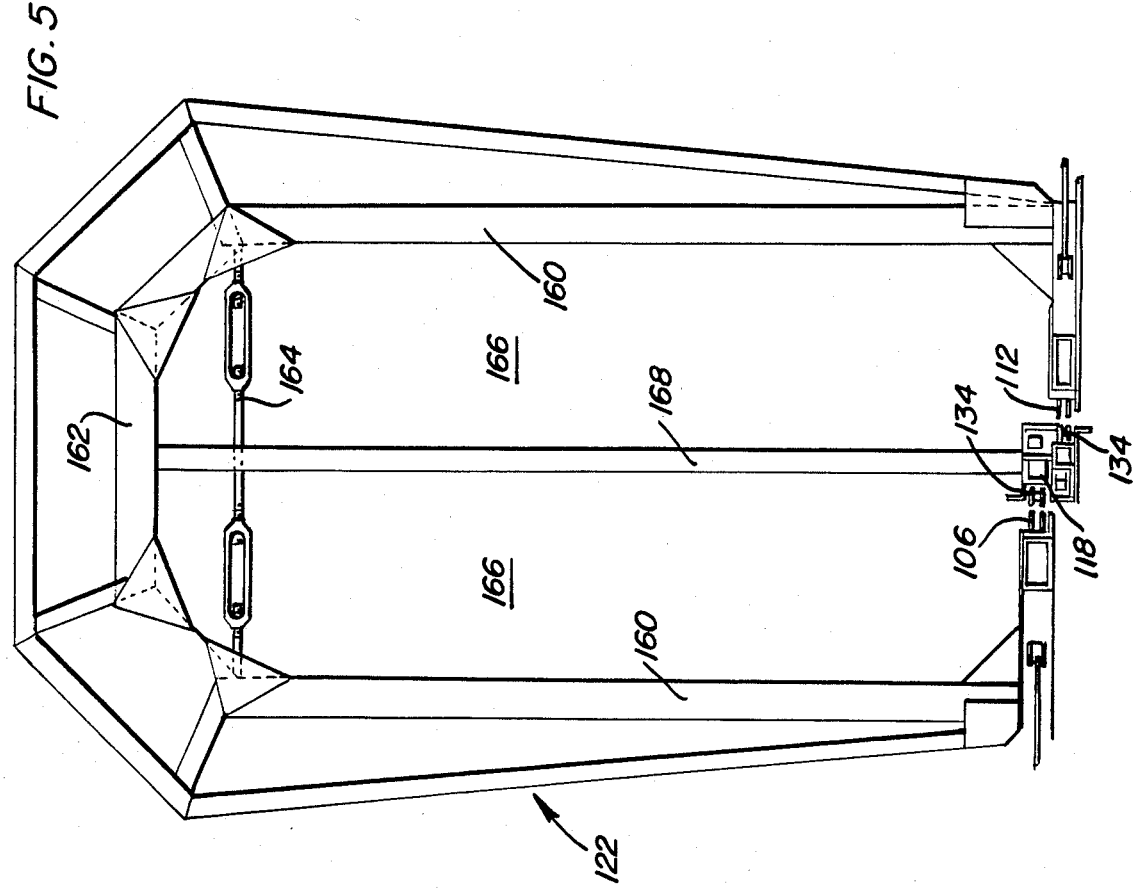
FIG. 5 is a sectional view of the crossing arm similar to FIG. 4 but illustrating the reinforced arch located at the point where cane from the two rows of sugar cane stalks meet.
Figure 4:
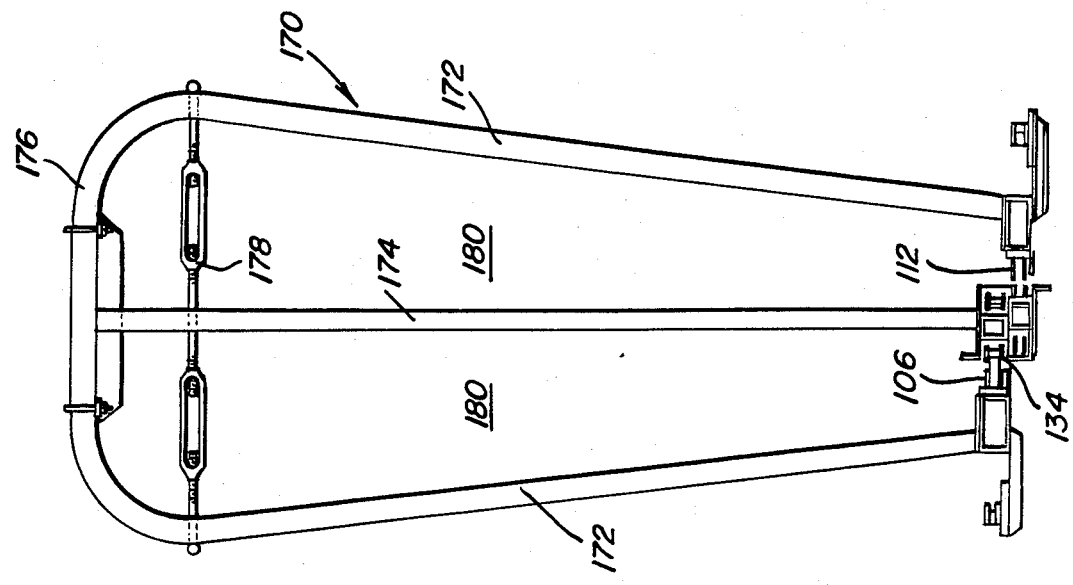
FIG. 4 is a transverse sectional view of the crossing arm illustrating the arches supported therewith.
Figure 6:
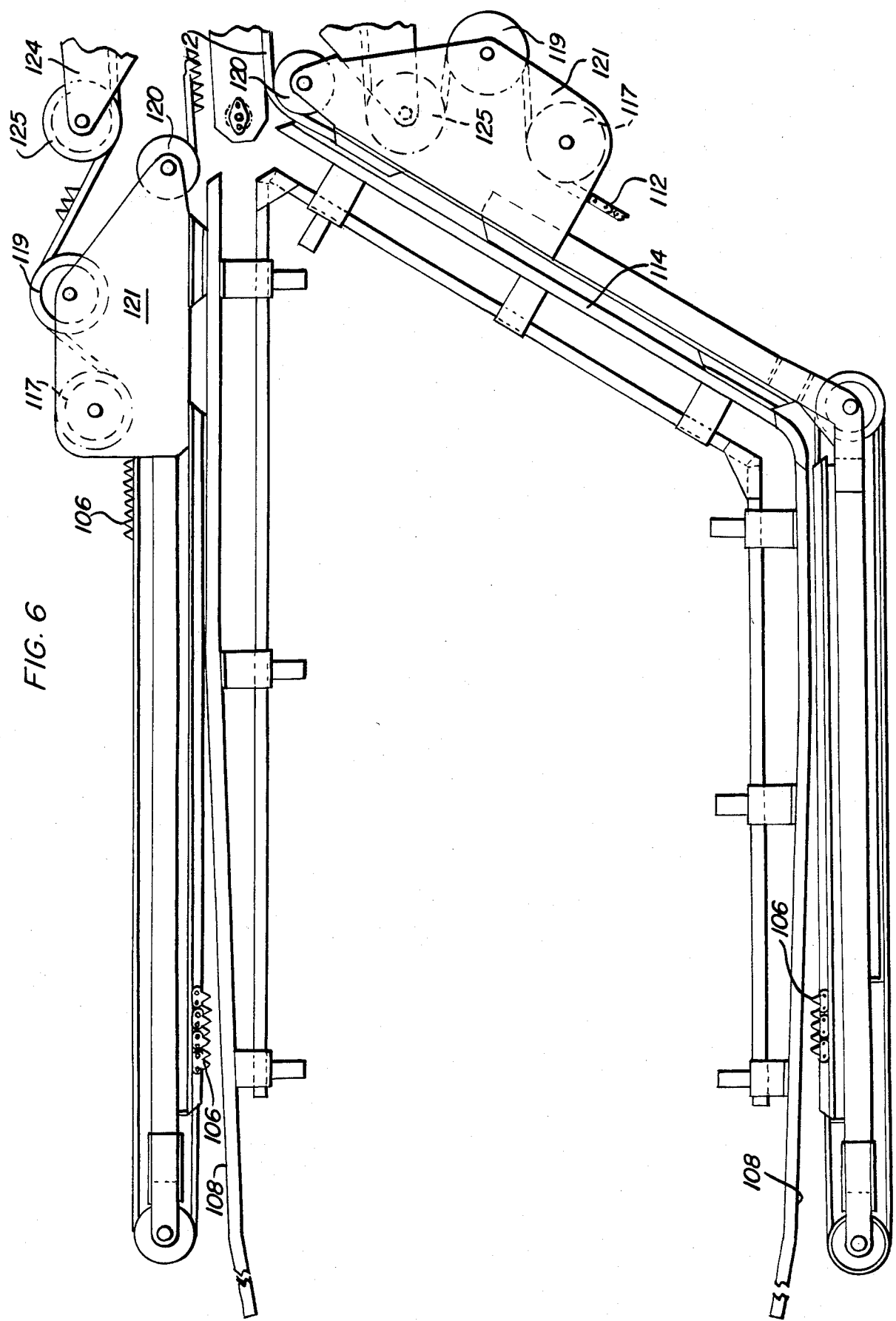
FIG. 6 is a fragmental plan view illustrating the conveyor for the two-row cane entering the single crossing arm.

FIG. 5 illustrates the reinforced arch 122 which is located where the two rows of sugar cane stalks are combined at the entrance to the crossing arm 116 with this structure including upright frame members 160 connected by top reinforced frame member 162 and a turnbuckle structure 164 to provide spaced passageways 166 which are vertically elongated to enable the upper ends of the sugar cane stalks to pass therethrough with the two spaces being divided by a central brace member 168 having the frame members 118, sprocket gears 125 and roller chains 134 supported therefrom. The outer frame members 160 connect to frame member 118 and brackets 124 and have sprocket gears 125 and sticker chain 112 and sticker chain 106 supported therefrom so that they will be maintained in opposed relation to the roller chains 134. FIG. 4 illustrates a typical arch which is positioned at longitudinally spaced points on the crossing arm with the arch 170 including side frame members 172 and a central frame member 174 interconnected by a top frame member 176 and a turnbuckle assembly 178 with the two spaces 180 being provided for the passage of the sugar cane stalks and with the frame members 118 and roller and sticker chains being supported from the lower end thereof.

The sticker chain in each conveyor assembly or unit is powered by suitable hydraulic motor unit or other power device as at 182 and the sticker chain in each instance is faced by a non-powered roller chain to reduce breakage and friction of cane coming through the harvester with the crossing arm including the two sticker chains 106 and 112 and two roller chains 134 with the single crossing arm 116 carrying two rows of cane. The No. 1 row or left side comes through the harvester and across the rear of the harvester at approximately a 60° angle to the line of travel and meets and joins with the cane from row No. 2 at the pivot point of the crossing arm 116. This enables two rows of cane to be handled by one common crossing or piling arm with the sticker chain being opposed by a guide surface or, if desired, a non-powered roller chain as in the crossing arm. The live non-powered roller chains provide the pressure rail on the crossing arm in opposed relation to the sticker chains and effectively assist in carrying the cane stalks as they come through power being the sticker chains on the opposite face of the roller chains.

The construction of the frame and single crossing arm permits the harvester to pile two rows of cane directly behind its self on the first pass. During the return pass or second pass, the harvester will cut the two rows of cane to the right of the initial two rows and pile the cane on top of the cane deposited from the initial two rows. The third pass of the harvester will cut the two rows of cane to the left of the two rows of cane cut during the initial pass and pile the cane on top of the initial two rows and the two rows from the return or second pass. Thus, by rotating the harvester in a clockwise motion around rows 3 and 4 of a six-row set, the harvester will make six-row heaps without rolling over the initial row as is presently necessary with single row harvesters. Additionally, existing two-row harvesters are only capable of making four-row heaps and they do so with double crossing arms, each carrying a single row of cane. In addition, existing two-row harvesters roll a wheel beneath the heap row prior to piling the cane. It is desirable to leave the profile of the furrow beneath the heap since it allows the cane loader to work in a predictable furrow profile and allows less chance of the cane piler scooping mud along with the cane. Thus, with a six-row heap, which is not possible with present harvesters without first rolling over the initial row, a more efficient loading is obtained by reducing the distance the loader must pile one grab full, reducing mud brought to the factory by reducing the distance loaders must push to pile one grab full and better burning from a more intense fire created by more material burning.

The specific structure of the various frame components, supporting bearings for the sprocket chains, drive arrangements, slack take-up, lubrication facilities and the like are not disclosed in detail inasmuch as these specific components are conventional in and of themselves and form no particular part of the present invention which is directed specifically to the improved top cutter and shredder feature, the single crossing arm carrying two rows of cane, the use of a powered sticker chain in opposed relation to a non-powered roller chain and the frame configuration which enables lateral adjustment of the discharge unit to make six-row heaps without rolling over the initial row of cut sugar cane.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A sugar cane harvester comprising a sugar cane gathering, lifting and severing means to engage, lift and sever sugar cane stalks oriented in two rows during forward movement of the harvester, a conveying unit for moving the two rows of cut sugar cane rearwardly on the harvester and moving one of the rows of cut sugar cane laterally to merge and join with the other row of cut sugar cane, and a single crossing arm receiving and conveying the combined rows of cut sugar cane rearwardly and discharging all of the cut sugar cane at a single point, said crossing arm being adjustable laterally of the harvester to enable six-row heaps of cut sugar cane to be formed without rolling over the initial row, said crossing arm including a pair of laterally spaced, longitudinally extending passageways with the inner surface of each passageway being defined by a non-powered roller chain and the outer surface of each passageway being defined by a powered sticker chain in opposed relation to the non-powered roller chain for gripping and conveying sugar cane stalks rearwardly of the crossing arm.

2. The sugar cane harvester as defined in claim 1 wherein said crossing arm includes a discharge assembly including a laterally pivotal member having a sticker chain extension mounted thereon and a guide structure for guiding the sugar cane from both passageways in the crossing arm into a single pile with the discharge point being laterally adjustable in relation to the crossing arm and the crossing arm being laterally adjustable in relation to the harvester.

3. The sugar cane harvester as defined in claim 2 wherein the gathering, lifting and severing means includes a pair of lower upwardly and rearwardly inclined generally cylindrical rotatable members with spiral rib means thereon driven to engage and elevate sugar cane stalks, and an upper pair of generally cylindrical rotatable members with spiral rib means thereon for engaging and lifting the upper portions of the sugar cane stalks.

4. The sugar cane harvester as defined in claim 3 wherein said gathering, lifting and severing means also includes a cutting and chopping assembly mounted above the upper ends of the upper pair of rotatable members, said cutting and chopping assembly including a plurality of blades movable in circular paths oriented at different elevations above the cylindrical rotatable members to cut and shred the top portions of the sugar cane stalks.

5. The sugar cane harvester as defined in claim 4 wherein said cutting and chopping assembly includes a generally cylindrical rotatable drum having a bottom plate projecting peripherally therefrom with radial blades spaced circumferentially of the bottom plate, vertically extending flanges mounted on said drum at circumferentially spaced points with each flange including a plurality of radial blades disposed in vertically spaced relation throughout the length of the flange, each flange including a tangentially extending blade having a tapered vertical edge extending substantially continuously throughout the length of the drum in radially spaced relation to the drum for effectively cutting and chopping the immature top portions of the sugar cane stalks.

6. In a two-row sugar cane harvester having means for cutting two rows of sugar cane and conveying it rearwardly, the improvement comprising converging conveying means bringing the two rows of cane into adjacent relation, a single crossing arm extending rearwardly from the converging conveying means and a discharge unit at the rear of the crossing arm to discharge both rows of sugar cane in a single heap, said crossing arm and discharge unit being laterally movable for discharging sugar cane at different lateral positions with respect to the center line of travel of the harvester, and means supporting the discharge unit from the crossing arm for lateral pivotal movement in relation to the crossing arm, said crossing arm including conveying means for conveying the two rows of cane in adjacent but laterally spaced longitudinal paths and merging the two rows of cane into a single row when transferring the two rows of cane into the discharge unit.

* * * * *